July 16, 1946. E. R. GREER 2,404,287
APPARATUS FOR REMOVING SNOW AND THE LIKE
Filed Feb. 16, 1944 6 Sheets-Sheet 2

INVENTOR
EDWARD R. GREER
By Paul, Paul & Moore
ATTORNEYS

July 16, 1946.  E. R. GREER  2,404,287
APPARATUS FOR REMOVING SNOW AND THE LIKE
Filed Feb. 16, 1944  6 Sheets-Sheet 3

INVENTOR
EDWARD R. GREER
By Paul, Paul & Moore
ATTORNEYS

July 16, 1946.    E. R. GREER    2,404,287
APPARATUS FOR REMOVING SNOW AND THE LIKE
Filed Feb. 16, 1944    6 Sheets-Sheet 4

INVENTOR
EDWARD R. GREER
By Paul, Paul & Moore
ATTORNEYS

July 16, 1946.    E. R. GREER    2,404,287
APPARATUS FOR REMOVING SNOW AND THE LIKE
Filed Feb. 16, 1944    6 Sheets-Sheet 6

INVENTOR
EDWARD R. GREER
By Paul, Paul & Moore
ATTORNEYS

Patented July 16, 1946

2,404,287

UNITED STATES PATENT OFFICE 2,404,287

APPARATUS FOR REMOVING SNOW AND
THE LIKE

Edward R. Greer, Wayzata, Minn.

Application February 16, 1944, Serial No. 522,563

29 Claims. (Cl. 37—42)

This invention relates to new and useful improvements in apparatus for removing snow, ice and other material, and more particularly to such apparatus of the general type disclosed in United States Letters Patent #2,199,723, issued May 7, 1940, to M. Garland and E. Greer, and Patent #2,241,252, issued May 6, 1941, to M. Garland and E. R. Greer.

In the apparatus disclosed in the above noted patents, the snow, ice and other material is moved along the surface of the moldboard into direct engagement with a high speed propeller type rotor mounted adjacent to the end of the moldboard, as the plow is moved forwardly by the propelling vehicle. The blades of the rotor impart a whirling action to the snow and accelerates its movement. The whirling action imparted to the snow is objectionable, because when the snow is "dry" and light, as it frequently is in cold weather, the agitation of the snow by the propeller may cause the fine snow to develop into a dense "cloud," which may at times partially or wholly obscure the driver's vision.

In each of the structures disclosed in the two above mentioned patents, the snow and ice moves along the face of the moldboard into direct engagement with the rotor mounted at the discharge end thereof, whereby the movement of the snow and other material is accelerated as it leaves the end of the moldboard, which facilitates its disposal.

The novel apparatus herein disclosed distinguishes from those illustrated in the above mentioned patents in that the snow being moved along the face of the moldboard is not directly engaged by a rotor, but is subjected to the action of a high velocity blast directed into or against the moving snow in the general direction of material travel, as the snow approaches the discharge end of the moldboard, whereby the movement of the snow is greatly accelerated and expanded, whereby its dissipation is made much more effective and thorough, and with the assurance that it will not pile up in ridges along the road-bed, as frequently occurs when using conventional snow removal equipment.

In accordance with the invention herein disclosed a suitable blower is mounted back of the moldboard with its discharge nozzle positioned adjacent to the path of travel of the snow along the face of the moldboard, whereby the snow moves directly into a high velocity blast which greatly accelerates its movement in a rearward and outward direction, and which greatly facilitates the dissipation of the snow and prevents it from piling up on the shoulders along the road-bed.

The amount of energy or power required to operate the blower to dissipate the snow and ice may be controlled to meet varying conditions. For example, if the snow to be removed from the road-bed or other surface is relatively deep or wet and heavy, more power may be required to operate the blower to effectively dissipate the snow as it leaves the end of the moldboard, than if the snow were light and dry. In some cases it may also be found desirable to operate the snow-plow without the use of a blast whereby the plow may be operated as a conventional snow-plow. It will thus be seen that when plowing or removing a light fall of snow requiring but a very light blast, or no blast at all, a considerable saving in power is effected because in such cases the power required for producing the blast is correspondingly reduced, and may be completely cut off. Such saving in power is impossible when using apparatus of the type disclosed in the two patents hereinbefore mentioned, wherein the rotors must be continually operated when the plows are in use so as not to block the discharge of the snow from the end of the moldboard.

I have found that a blower such as herein disclosed, may be efficiently operated in conjunction with a snow-plow to effect complete and thorough dissipation of the snow with a minimum of power, primarily because of the unique mounting of the blower nozzle with respect to the moldboard, and due to the fact that the blower is not directly engaged by the snow or other material to be moved by the moldboard.

The blast for accelerating the movement of the snow may be furnished by mechanically driven blowers or by jet propulsion burners mounted back of the moldboard. When jet type burners are used, a hot blast is directed against the moving snow which, in addition to accelerating its movement, expands and may melt the major portion of the snow and ice to thereby effect complete and thorough dissipation of the snow. A further advantage in the use of a high velocity blast such as herein disclosed, resides in the fact that because the blast projected from the nozzle is always directed into the normal line of travel of the snow or material from the moldboard, whereby the reaction of the blast against the snow also exerts a forwardly propelling thrust on the outer end of the moldboard which facilitates the movement of the plow by the propelling vehicle, and also tends to stabilize the movement of the apparatus along the highway.

An object of the present invention therefore is to provide an improved snow-plow comprising a moldboard having means provided at the outer end thereof for directing a high velocity blast into the snow moving along the face of the moldboard and in the general direction in which it is desired to discharge the snow, whereby the snow is suddenly expanded and its movement accelerated as it is engaged by said blast, and is thereby driven outwardly away from the moldboard and dissipated.

A further object of the invention is to provide a wing-type moldboard having means for directing a high velocity blast in an outward direction against snow being moved along the surface of the moldboard and whereby the reaction of said blast against the snow will exert a forward propelling thrust on the outer end of the moldboard which will tend to balance or stabilize the steering of the propelling vehicle, as it will substantially eliminate a "side pull" on the propelling vehicle as result of the mold plow engaging snow banks along one side of the vehicle.

A further object is to provide a moldboard having a suitable blower mounted rearwardly thereof and provided with an elongated high velocity nozzle disposed transversely of the moldboard adjacent to the discharge end thereof adapted to direct a high velocity blast against snow or other material being moved along the face of the moldboard by the forward movement thereof, and said nozzle having deflecting means therein for upwardly directing the snow and other material as its movement is suddenly accelerated by the blast discharging from said nozzle.

A further object is to provide a snow-plow comprising a moldboard having a jet propulsion burner mounted rearwardly thereof for directing a hot blast into the snow discharging from the moldboard, thereby to suddenly expand and melt the snow as it discharges from the moldboard.

A further object is to provide in combination with a moldboard, a jet propulsion burner having an elongated high velocity nozzle positioned adjacent the outer or discharge end of the moldboard adapted to direct a high velocity hot blast in the general direction of material travel, thereby to greatly accelerate the movement of the snow and dissipation thereof, and such blast also acting to exert a forward propelling thrust on the moldboard.

A further object is to provide a vehicle having a jet propulsion burner mounted thereon with its discharge positioned to direct a hot blast in an outwardly and rearwardly direction with respect to the vehicle, whereby said blast may be utilized for melting snow and ice along a roadway, and also whereby the thrust reaction of said blast will exert a forwardly propelling effect on the vehicle.

Features of the invention reside in the novel manner of mounting the blower housing upon the moldboard whereby the moldboard may be freely adjusted vertically and horizontally without affecting the driving connection between the blower and the power device mounted upon the propelling vehicle; in the pivotal mounting of the blower on the moldboard; in the provision of a V-type snow-plow comprising oppositely disposed moldboards, each provided with a blast generating device adapted to direct a high velocity blast against snow and other material discharging from said moldboards, thereby to greatly accelerate the movement of the snow and dissipation thereof, and said blasts also exerting a forward propelling thrust against the moldboards of the snow-plow whereby the plow may be operated with less power; in the provision of a moldboard having a combustion chamber mounted rearwardly thereof provided with suitable means for supplying air and fuel thereto to provide a combustible fuel mixture; and in the provision of a simple blast generating means which readily lends itself for mounting on conventional snow-plows whereby such snow removing equipment may readily be converted into a combination plow and blast snow remover at very low cost.

Other objects of the invention will appear from the following description and the accompanying drawings and will be pointed out in the annexed claims.

In the accompanying drawings there has been disclosed a structure designed to carry out the various objects of the invention, but it is to be understood that the invention is not confined to the exact features shown, as various changes may be made within the scope of the claims which follow.

Figure 1:
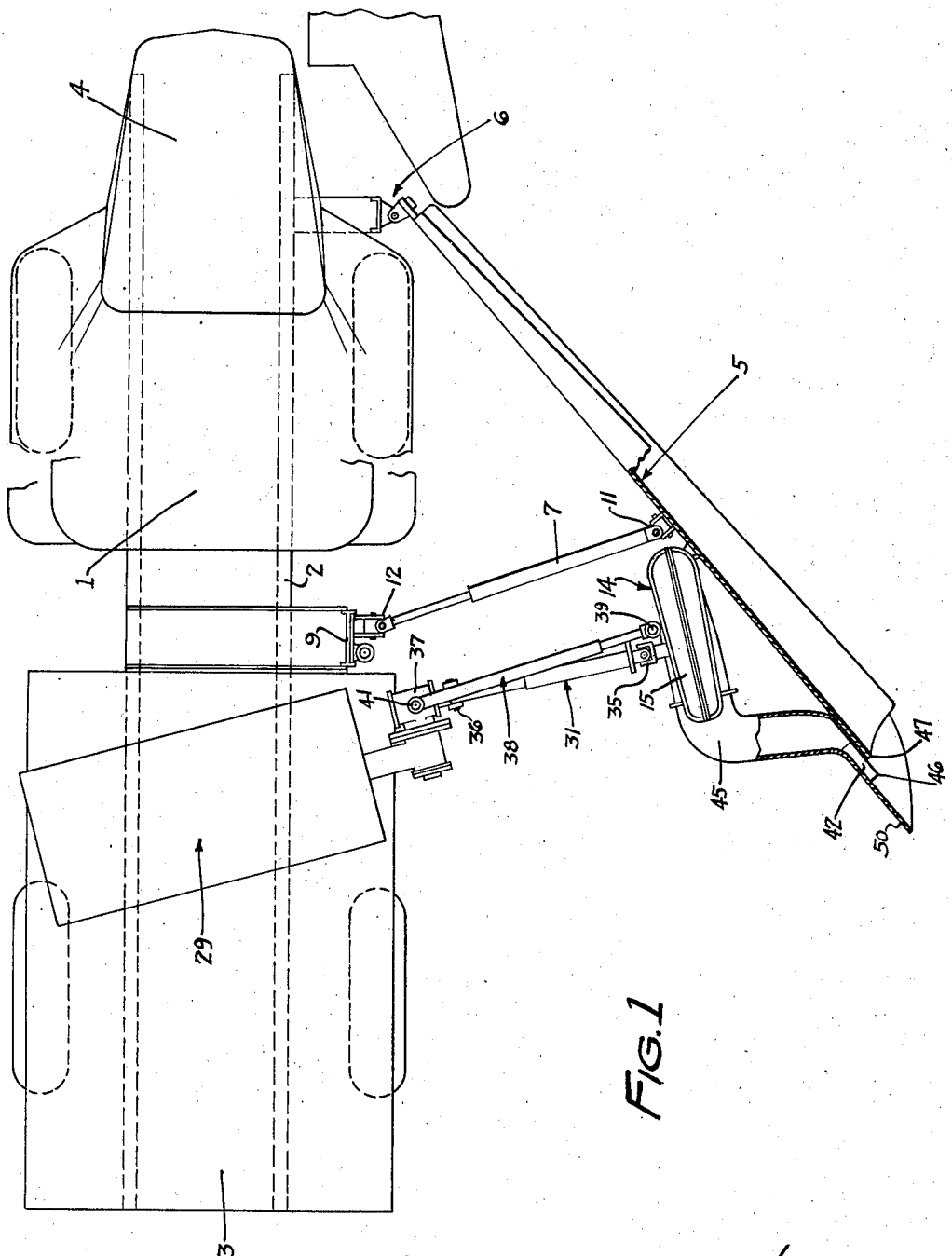
Figure 1 is a plan view of a vehicle provided with a wing-type moldboard and showing my invention applied thereto.
Figure 2:
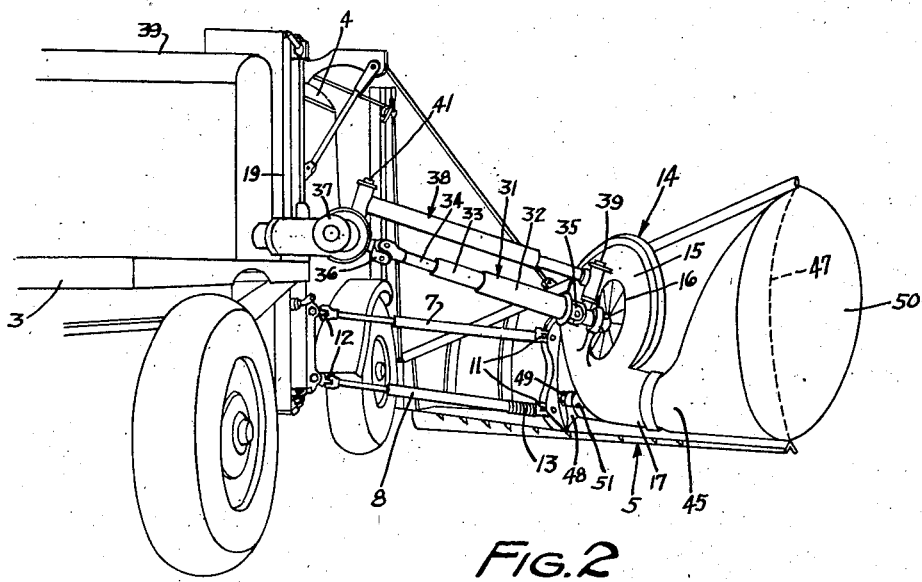
Figure 2 is a perspective view of a portion of the vehicle and moldboard showing the fan on the moldboard and its connections with the power unit on the vehicle.
Figure 3:
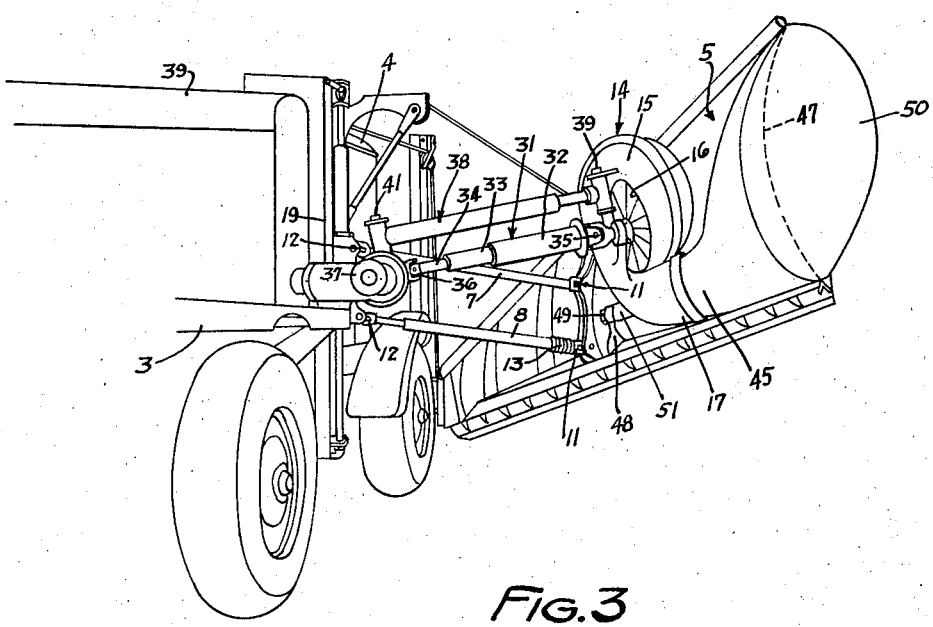
Figure 3 is a view similar to Figure 2, showing the moldboard in an elevated position.

In the selected embodiment of the invention herein disclosed, there is illustrated in Figures 1, 2 and 3, for purposes of disclosure, a portion of a propelling vehicle comprising the usual chassis frame 2 mounted on suitable carrying wheels. A suitable body 3 may be mounted on the rear end portion of the chassis back of the driver's cab 1, and the usual engine hood 4 is shown located forwardly of the cab 1.

A wing-type moldboard, generally designated by the numeral 5, is shown mounted on the propelling vehicle and has its forward end pivotally connected thereto as indicated at 6, whereby the position of the moldboard with respect to the vehicle may be varied in the usual manner, as is well known in apparatus of this general type. Thrust members 7 and 8 are interposed between the moldboard and an upright bracket 9 secured to the vehicle frame.

The thrust members are connected to the moldboard and bracket 9, respectively, by suitable universal joints 11 and 12. Each thrust member is composed of two or more telescoping sections whereby the thrust members may be longitudinally adjusted to maintain the moldboard at a predetermined angular position horizontally, with respect to the propelling vehicle. The lower thrust member 8 may be provided at its outer end with a suitable cushion spring 13 to absorb shocks, in the event the cutting edge of the moldboard engages a fixed object when the plow is in operation. The thrust members 7 and 8 and their connections with the moldboard and vehicle are very similar to the corresponding parts shown in Patent #2,241,252, herein before referred to, and it is therefore deemed unnecessary to describe them in further detail herein.

An important feature of the present invention resides in the provision of means for delivering a high velocity blast in the direction of material travel along the moldboard for the purpose of accelerating the movement of the snow and other material discharging from the moldboard and to facilitate its dissipation. The blast is projected in the general direction of travel of the snow from the moldboard, whereby the snow being moved by the plow will not pile up in ridges along the shoulder of the road or surface being cleared, as when using a conventional snow-plow.

Figure 4:
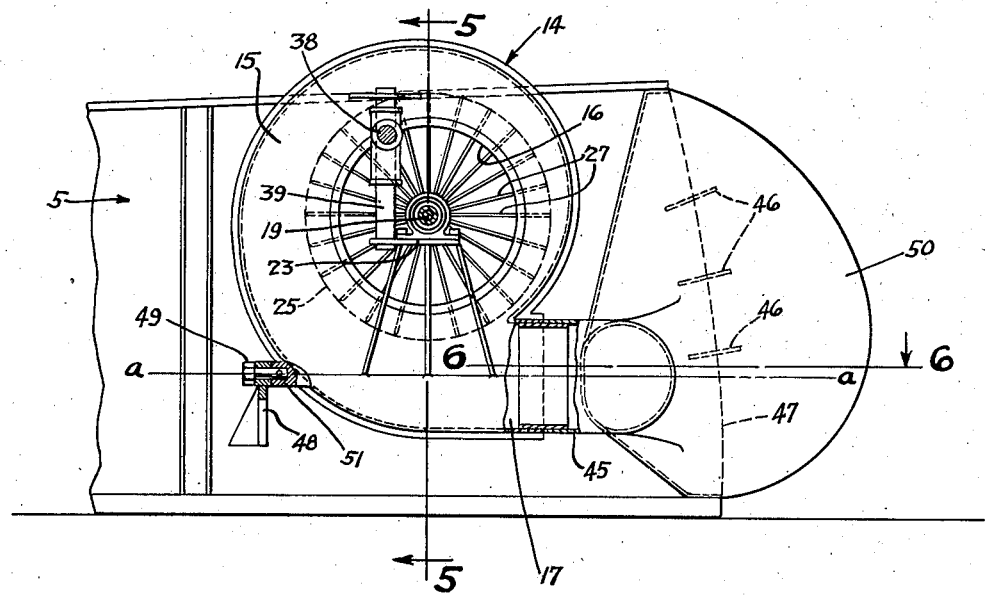
Figure 4 is an enlarged detail view, partially in section, showing the pivotal mounting of the blower on the moldboard.

The means provided for thus directing a high velocity blast against the material traveling along the face of the snow-plow or discharging therefrom, is shown comprising a suitable blower, generally designated by the numeral 14, and comprising a housing 15 having air intakes 16 at its opposite sides and having a tangential exhaust or air outlet 17, as best illustrated in Figure 4.

Figure 5:
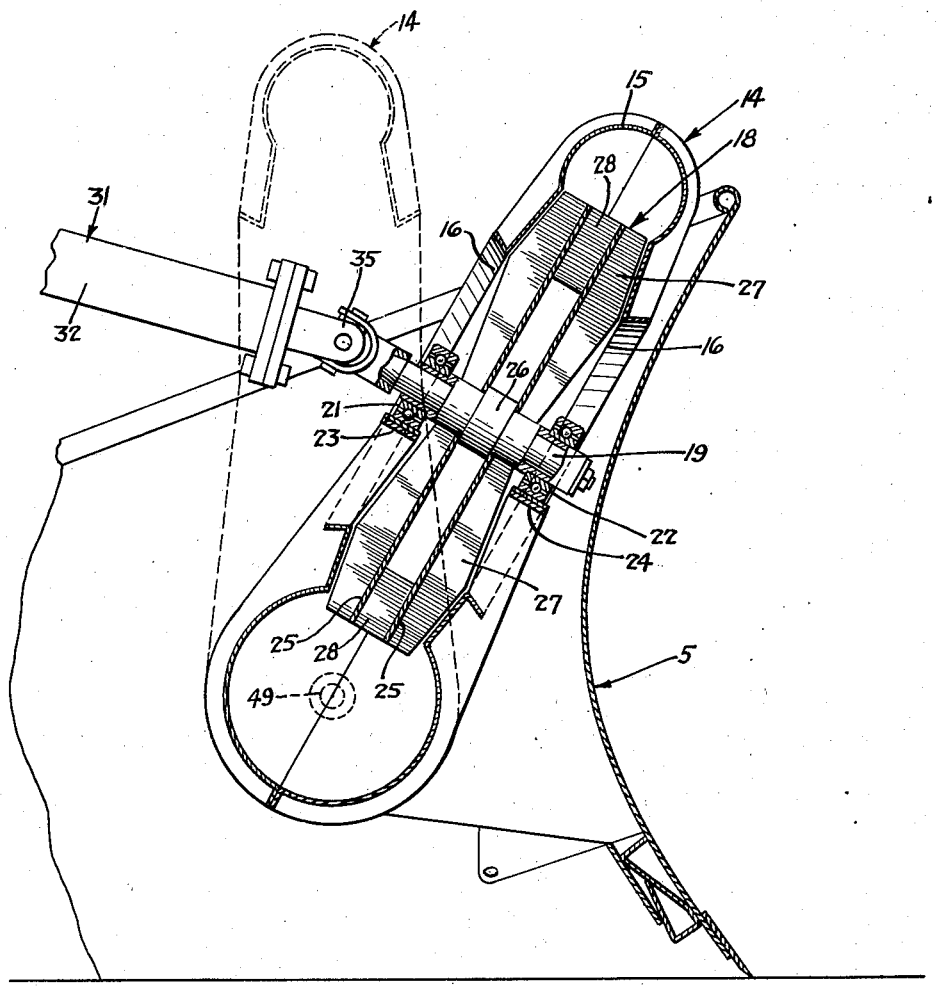
Figure 5 is an enlarged detail sectional view on the line 5—5 of Figure 4, showing in full and dotted lines the pivotal movement of the blower on the moldboard.

A suitable rotor 18 is mounted on a shaft 19 within the blower housing 15, and the shaft 19 is supported in suitable bearings 21 and 22 secured to suitable bearing supporting brackets 23 and 24 which in turn are secured to the blower housing 15, as clearly indicated in Figures 4 and 5.

The blower 14, as shown in Figures 4 and 5, comprises a pair of spaced disks 25 secured to a hub 26 fixed to the shaft 19. Suitable radially disposed blades 27 are secured to the disks 25, and relatively shorter blade sections 28 are mounted between the spaced disks 25 at the periphery of the rotor and cooperate with the blades 27 to generate a high velocity blast which discharges from the air outlet or exhaust 17 of the blower housing when the rotor is operated at high speed, as will readily be understood.

The rotor 18 of the blower 14 may be driven from a suitable power unit 29 mounted on the vehicle body, as indicated in Figure 1, or it may be driven from the usual power take off shaft of the engine of the propelling vehicle.

The means provided for operatively or drivingly connecting the rotor to the power unit 29 is shown comprising a telescoping shaft, generally designated by the numeral 31, which may comprise a plurality of telescoping sections 32, 33 and 34. The shaft section 32 is operatively connected to the rotor shaft 19 by a suitable universal joint 35, and the opposite end section 34 of the shaft 31 is connected by a universal joint 36, to a relatively shorter shaft, not shown, mounted in a gear box 37 and having a geared connection with the power unit 29 by suitable gears not shown in the drawings. This power drive is clearly illustrated in Patent #2,241,252, and it is therefore thought unnecessary to herein describe the same in detail.

A telescoping focusing arm 38 has one end pivoted to an upright post 39 mounted in fixed relation to the rotor shaft 19. The opposite end of the focusing arm 38 is similarly connected to an upright post 41 mounted in relatively fixed relation upon the gear housing 37, as will readily be understood by reference to Figures 1, 2 and 3.

The focusing arm 38 is positioned substantially in parallel relation to the rotor drive shaft 31, and functions to always retain the blower 14 in relatively fixed driving relation to the drive shaft 31, as will readily be understood by reference to Figures 2 and 3.

Another important feature of the invention resides in the novel construction and arrangement of the high velocity nozzle of the blower 14, generally designated by the numeral 42, in Figure 1. The outlet 17 of the fan housing is connected to one end of a conduit 45 which extends rearwardly and is outwardly flared, as shown in Figures 2, 3 and 4, to provide a narrow elongated nozzle 42, disposed transversely of the moldboard and extending substantially the full width thereof, as shown in Figures 2, 3 and 4.

Figure 6:
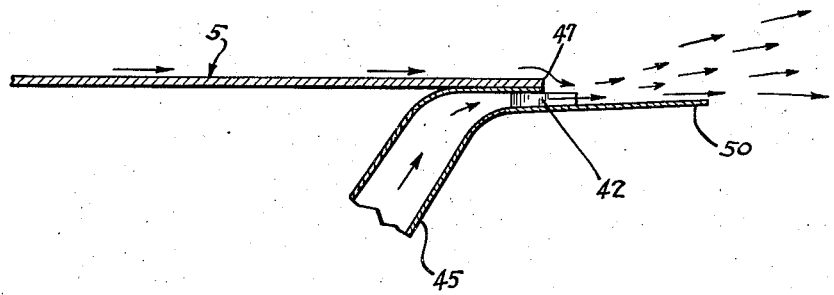
Figure 6 is a diagrammatic view substantially on the line 6—6 of Figure 4, showing the action of the blast on the snow at the discharge end of the moldboard.

The outer or rear wall 50 of the nozzle 42 is shaped to extend well beyond the end of the moldboard, whereby it forms in effect a continuation of the moldboard, as best shown in Figures 1 and 6. Suitable deflectors 46 are provided in the discharge nozzle 42 and are slightly upwardly inclined, thereby to slightly upwardly direct the air blast discharging from the nozzle, as will readily be understood by reference to Figure 4. The deflectors 46 preferably have their rear ends extending beyond the rear edge 47 of the moldboard, as shown.

Another important feature of the invention resides in the pivotal mounting of the blower housing upon the moldboard, whereby the moldboard may be adjusted to any desired position with respect to the propelling vehicle without interfering with the operation of the blower drive, and whereby an efficient driving connection is always maintained between the blower rotor and the power unit on the vehicle, regardless of the position of the moldboard on the vehicle.

To thus mount the blower on the moldboard, a suitable bracket 48 is welded or otherwise fixed to the back face of the moldboard and is bored to receive a pivot pin 49 having its inner end secured to a lug or fixed portion 51 of the blower housing. The axis of the pivot pin 49 is disposed in the axis a—a of the blower discharge opening 17, as shown in Figure 4. The cylindrical wall portion of the blower discharge 17 is rotatably received in the conduit 45 of the nozzle 42, whereby the blower housing 15 may pivot about the axis a—a, as shown in Figure 5. The focusing arm 38 constantly retains the blower housing in a more or less fixed relation to the telescoping drive shaft 31 of the rotor shaft 19, as hereinbefore stated.

An important distinction in the novel apparatus herein disclosed over the structures disclosed in the above mentioned patents, resides in the fact that the snow or other material being conveyed along the surface of the material is not delivered into direct contact with the blades of a high speed rotor, but into a high velocity blast which immediately picks up the snow or other material and greatly accelerates its movement along the normal path of travel of the material from the moldboard. This will readily be understood by reference to Figure 6, wherein it will be noted that as the snow or other material discharges from the end 47 of the moldboard, it passes directly into the high velocity blast discharging from the narrow elongated nozzle 42 of the blower, whereby its movement is greatly accelerated by the blast in the general direction of material travel from the moldboard, as indicated by the arrows in Figure 6.

The high velocity air blast discharging from the nozzle 42 has a tendency to create a partial vacuum at the discharge end of the moldboard, which draws the snow and other material directly into the blast, as will be understood by reference to Figure 6, whereby the material is directed outwardly in a rearward direction a considerable distance from the end of the moldboard, whereby the snow is not likely to be blown in front of the vehicle where it might obscure the driver's vision. The snow will also be blown well over the shoulder along the roadbed and away from the propelling vehicle, whereby it will not be left in ridges along the path being cleared, which is of particular importance when removing snow from airport runways, and the like, which must be kept free from obstructions.

The rearwardly directed blast from the end of the moldboard also has a tendency to exert a forwardly propelling thrust on the outer end of the moldboard which is helpful in stabilizing the forward movement of the propelling vehicle, as it tends to reduce side thrust on the vehicle. The forward thrust thus exerted on the outer end of the moldboard will also tend to exert a forward propelling force on the vehicle, as will readily be understood, which may in some instances result in a saving of power.

Figure 7:
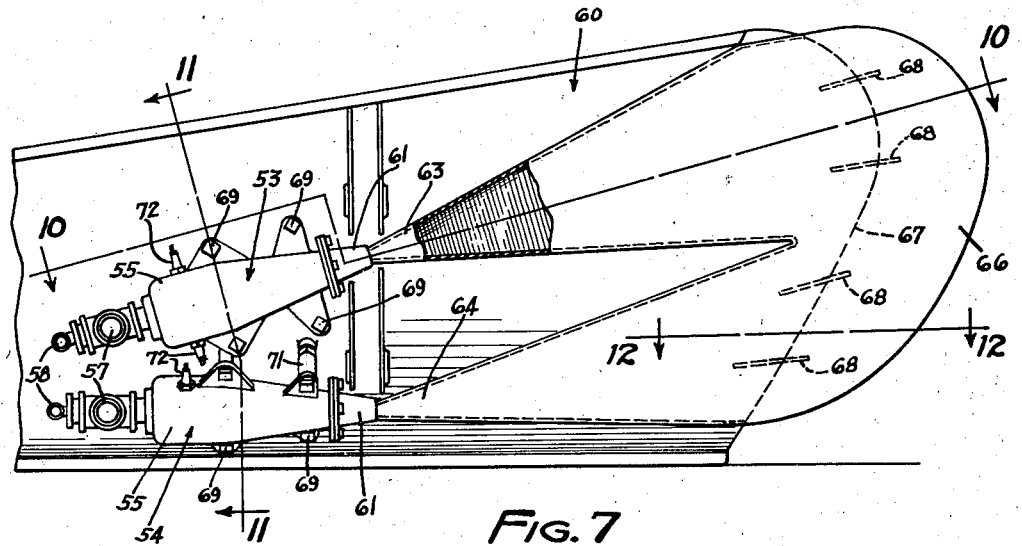
Figure 7 is a view showing a moldboard having two jet propulsion burners mounted thereon with their exhaust nozzles positioned at the discharge end of the moldboard.
Figure 8:
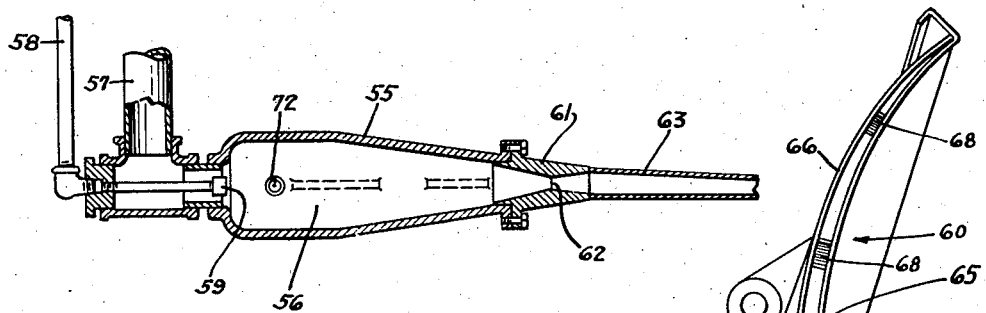
Figure 8 is a detail sectional view through one of the jet propulsion burners.

In Figure 7 there is illustrated a moldboard 60 provided with a plurality of jet propulsion burners, generally designated by the numerals 53 and 54. Each burner is shown comprising a housing 55 providing a combustion chamber 56 to which air may be supplied from a conduit 57. Liquid fuel is supplied from a pipe 58 having an atomizing head 59 provided at its inner end adjacent to the combustion chamber 56.

Figures 9, 12:
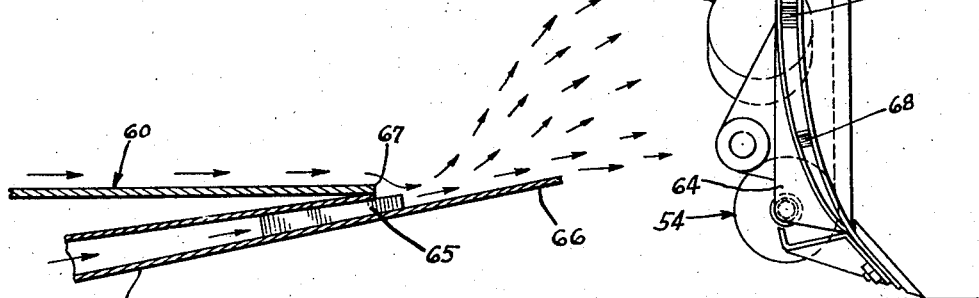
Figure 9 is an end view of Figure 7 showing the narrow elongated burner nozzle and the means provided therein for slightly upwardly directing the blast.
Figure 12 is a diagrammatic detail sectional view substantially on the line 12—12 of Figure 7, showing the action of the hot blast on the snow and ice discharging from the end of the moldboard.

The housing 55 of each combustion chamber 56 has its exhaust end outwardly directed, as best shown in Figure 7, and each has a fitting 61 secured thereto. Each fitting 61 has a restricted passage 62 therein. The fittings 61 of the burners 53 and 54 are connected respectively to outwardly flaring relatively flat conduits 63 and 64, which are connected together at their outer ends and cooperate to provide a relatively long narrow discharge nozzle 65, disposed transversely of the moldboard and extending substantially the full width thereof in a vertical direction, as illustrated in Figures 7 and 9. The back wall 66 of the nozzle 65 extends beyond the end 67 of the moldboard, as shown in Figures 7 and 12, whereby it provides in effect a continuation of the moldboard. Suitable deflectors 68 are provided in the nozzle 65 to slightly upwardly direct the hot blast discharging therefrom.

Figure 10:
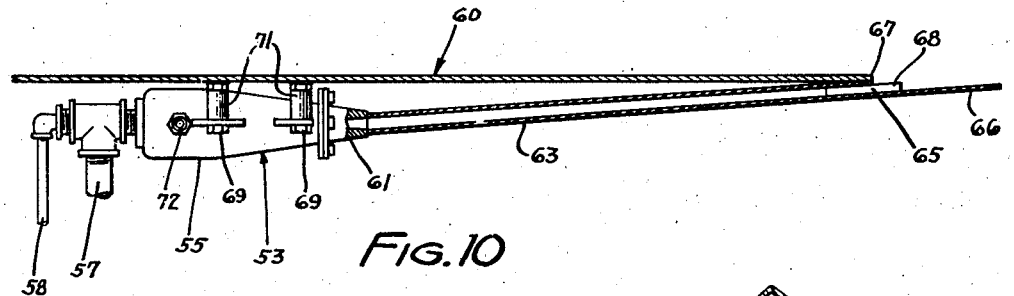
Figure 10 is a detail sectional view substantially on the line 10—10 of Figure 7, with some of the parts omitted.
Figure 11:
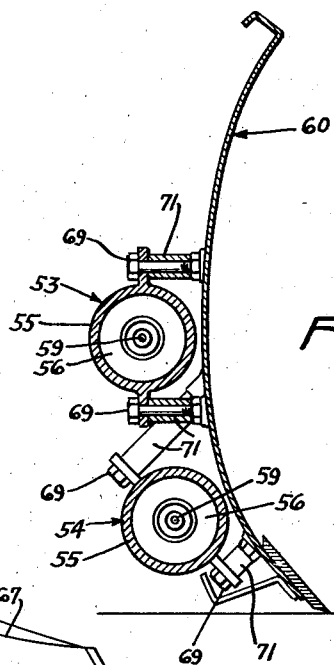
Figure 11 is a vertical sectional view on the line 11—11 of Figure 7.

The burners 53 and 54 may be supported directly upon the moldboard by suitable bolts 69 and spacers 71, as shown in Figures 7, 10, and 11. Each burner is also provided with suitable spark plugs 72 for igniting the fuel charges within their combustion chambers. The spark plugs are connected to a suitable ignition supply means, not shown, preferably mounted on the propelling vehicle.

Means, not shown, is provided on the propelling vehicle for supplying the burners with measured quantities of liquid fuel and air to provide a highly combustible fuel mixture which may readily be ignited by the spark plugs 72. The fuel supply means is variable, as is well known in the art, whereby the blast projected from the nozzle 65 may be varied in accordance with the work to be performed. In other words, if the fall of snow to be removed is heavy, a relatively stronger blast may be required than if there is less snow to be moved.

In the operation of a snow-plow provided with a jet propulsion burner such as illustrated in Figures 7 to 13, inclusive, the snow travels along the face of the moldboard 60 in the usual manner, but when it discharges from the end thereof it passes directly into the hot blast projected from the nozzle 65 of the burners, whereby its movement is greatly accelerated, and at the same time the snow is expanded and melted, as clearly illustrated in Figure 12. Because of the high velocity of the hot blast discharging from the nozzle 65, a partial vacuum tends to form at the tail end 67 of the moldboard which draws the snow, ice, and other material directly into the hot blast, whereby its movement is instantly accelerated and the dissipation of the snow is greatly facilitated.

I have found from actual experience that when projecting a hot blast into snow, the multitude of air cells within the body of snow are instantly expanded, whereby the snow is separated into a multitude of small particles which tend to scatter in all directions as indicated by the arrows in Figure 12. When the snow is thus expanded and separated, the hot blast directed into it from the nozzle 65 may melt the major portion thereof, whereby its dissipation is made relatively complete and thorough. It will also be noted that the movement of the snow and ice discharged from the moldboard will be in the general direction of snow travel on the moldboard, and because of the high velocity of the hot blast the snow particles that may not be melted by the blast are blown a considerable distance outwardly and rearwardly away from the moldboard and vehicle, thereby preventing the formation of ridges along the cleared path, as is now common when utilizing conventional snow-plow equipment.

Figure 13:
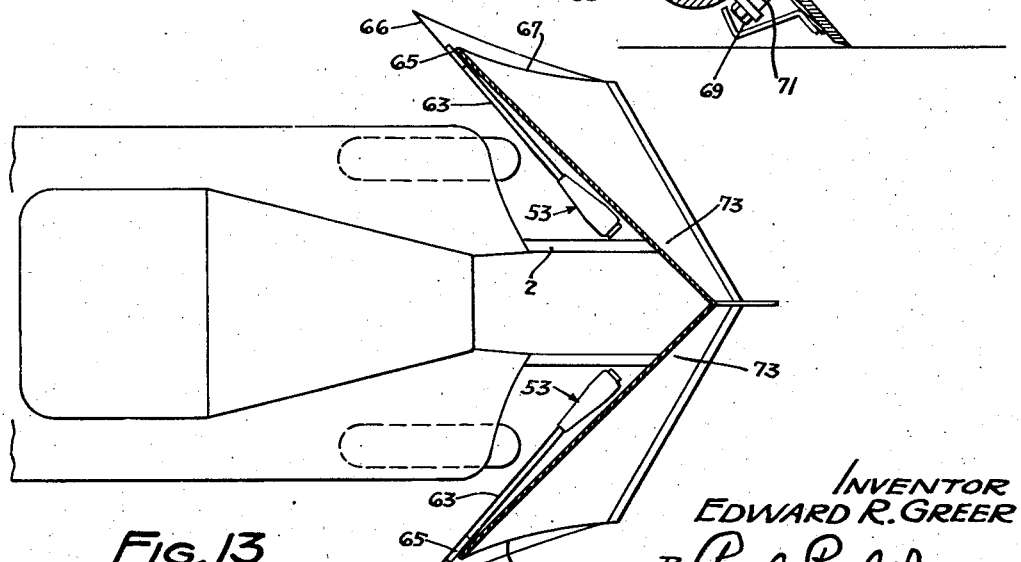
Figure 13 is a plan view of a portion of a vehicle having a V-type snow-plow mounted thereon and provided with jet propulsion burners.

The rearwardly and outwardly directed high velocity hot blast, in addition to effectively accelerating the movement and dissipation of the snow, also exerts a forwardly propelling thrust or force on the outer end of the moldboard which minimizes the side pull on the propelling vehicle, when a wing-type moldboard is used, and when a V-type plow is utilized as shown in Figure 13, the force of the blast in a rearward direction at each side of the snow plow may have a definite propelling effect on the vehicle, as will readily be understood.

In Figure 7 I have shown two jet propulsion burners mounted on a moldboard. It is to be understood that one or more such burners may be utilized depending upon the nature of the work to be performed. In some instances, the burners may be mounted on a suitable frame adjustably carried on the vehicle whereby it may be utilized for directly projecting a hot blast into snow and ice to dissipate such material without the use of a moldboard.

In Figure 13 there is shown a V-type snowplow comprising angularly disposed moldboards 73 each provided with jet propulsion burners 53 and 54, as shown in Figure 7. When utilizing jet propulsion burners with such a snow-plow, the rearward thrust exerted by the high velocity jets against snow, ice and other material, will have a forward propelling effect on the plow, whereby less power may be required from the vehicle engine to propel the apparatus.

In the apparatus herein disclosed it will be noted that the snow moving along the face of the moldboard is not directly engaged by a rotor or other moving elements. It is delivered into a high velocity blast which may be either cold or hot, as herein disclosed, and the velocity of which is such that the movement of the snow as it leaves the moldboard is greatly accelerated in its normal direction of movement, whereby the unmelted snow is dissipated over a wide area remote from the end of the moldboard.

Also because of the blast producing means being mounted rearwardly of the moldboard, the snow-plow or moldboard may be used as a conventional plow and without an air blast, when it is deemed unnecessary to utilize a high velocity blast. This is a desirable feature because it effects a saving in fuel, when the plow or moldboard is operated without the blast, as will be understood. When the blast is utilized in conjunction with the plow or moldboard, the apparatus may be operated through drifts and deep snow without danger of the snow piling up and clogging at the end of the moldboard.

It will be apparent to those skilled in the art that I have accomplished at least the principal objects of my invention, and it will also be apparent to those skilled in the art that the embodiments herein described may be variously changed and modified without departing from the spirit of the invention, and that the invention is capable of uses and has advantages not herein specifically described; hence it will be appreciated that the herein disclosed embodiments are illustrative only, and that my invention is not limited thereto.

I claim as my invention:

1. The combination with a vehicle having a moldboard mounted thereon, of a blast generating unit mounted directly upon the moldboard adapted to direct a blast of air in the direction of the material discharging from the outer or trailing end of the moldboard, thereby to greatly accelerate the movement of the material and the dissipation thereof, and means mounting said unit for relative pivotal movement on the moldboard to facilitate maintaining a driving connection with the unit.

2. The combination with a vehicle having a moldboard mounted thereon, of an air blast device mounted directly upon the moldboard and having a discharge nozzle positioned adjacent to the discharge end of the moldboard, the width of said nozzle being substantially equal to the width of the up and down height of the moldboard, means for rendering the air blast device operable to direct a high velocity blast against the material as it discharges from the moldboard, in the direction of material travel, and deflectors in said nozzle for upwardly directing the material as it discharges from the moldboard.

3. The combination with a vehicle having a moldboard mounted thereon, of an air blast device mounted directly upon the moldboard and having an elongated narrow discharge nozzle positioned adjacent to the discharge end of the moldboard, the length of said nozzle being equal to at least one-half of the width of the moldboard in a direction transversely thereof, means for rendering said blast device operable to direct a high velocity blast into the material discharging from the moldboard, in the direction of material travel, thereby to accelerate the movement of the material and the dissipation thereof, and means in said nozzle for slightly upwardly directing the material.

4. The combination with a vehicle having a moldboard mounted thereon, of a power driven blower mounted directly upon the moldboard and having its discharge located adjacent to the outer end of the moldboard and arranged to direct a blast of air into the material discharging from the moldboard in the direction of material travel, thereby to accelerate the movement of the material and the dissipation thereof, and a deflector in the blower discharge for upwardly directing at least a portion of the snow discharging from the moldboard.

5. The combination with a vehicle having a moldboard mounted thereon, of a power driven blower mounted directly upon the moldboard and having its discharge located adjacent to the outer end of the moldboard and arranged to direct a blast of air into the material discharging from the moldboard, in the direction of material travel, thereby to accelerate the movement of the material and the dissipation thereof and deflecting means in the blower discharge for slightly upwardly directing the material as it leaves the moldboard.

6. The combination with a power propelled vehicle having a moldboard mounted thereon, of a blower comprising a housing mounted directly upon the moldboard and having a tangential discharge nozzle terminating adjacent to the outer end of the moldboard, means carried on the vehicle for driving the blower, and means whereby the blower may pivot about the axis of said discharge nozzle.

7. The combination with a power propelled vehicle having a moldboard mounted thereon, of a blower comprising a housing supported on the moldboard and having a tangential discharge opening terminating in a narrow high velocity discharge nozzle located adjacent to the outer end of the moldboard and extending substantially the width thereof, whereby said blower may direct a blast of air into the material discharging from the moldboard, in the direction of material travel, thereby to accelerate the movement of the material and the dissipation thereof, and means whereby the blower may pivot about the axis of said discharge nozzle.

8. The combination with a power propelled vehicle having a moldboard mounted thereon, of a blower supported on the moldboard and having a narrow high velocity discharge nozzle located adjacent to the outer end of the moldboard and extending substantially the width thereof, whereby said blower may direct a blast of air into the material discharging from the moldboard, in the direction of material travel, thereby to accelerate the movement of the material and the dissipation thereof, and a plurality of upwardly inclined vanes in said discharge for slightly upwardly directing the discharge material above its normal path of travel.

9. The combination with a vehicle having a power unit mounted thereon and provided with a moldboard for removing snow and the like, of a blower comprising a housing mounted directly behind the moldboard and having a tangential discharge terminating in a restricted discharge nozzle at the outer end of the moldboard, a driving connection between the blower and said power unit whereby the blower may be operated to direct a blast of air into the material discharging from the moldboard, in the direction of material travel, thereby to accelerate the movement of the material and the dissipation thereof, and means mounting the blower housing for pivotal movement relative to the moldboard.

10. The combination with a power propelled vehicle having a moldboard mounted thereon, of a blower mounted directly upon the moldboard and having its discharge arranged to direct a blast of air into the material moving along the moldboard, in the direction of material travel, a power unit on the vehicle, a driving connection between the blower and power unit, and means pivotally mounting the blower on the moldboard whereby the blower may relatively pivot thereon and retain its operative relationship with said driving connection, when the moldboard is vertically adjusted relatively to the ground.

11. The combination with a power propelled vehicle having a moldboard mounted thereon, of a blower supported on the rear of the moldboard and having a tangential discharge provided with a nozzle located adjacent to the outer end of the moldboard, a power unit on the vehicle, a shaft operatively connecting the blower to said power unit, and means mounting the blower for relative pivotal movement about the axis of said tangential discharge, whereby the blower may relatively pivot on the moldboard to retain its driving relationship with said shaft, when the moldboard is vertically adjusted relatively to the vehicle.

12. The combination with a power propelled vehicle having a moldboard mounted thereon, of a centrifugal blower mounted on the rear of the moldboard and having a tangential discharge provided with a nozzle located adjacent to the outer end of the moldboard, a power unit on the vehicle, a telescoping shaft operatively connecting the blower to said power unit, means mounting the blower for relative pivotal movement about the axis of said tangential discharge, whereby the blower may pivot on the moldboard when the outer end of the moldboard is vertically adjusted relatively to the vehicle, and means associated with said shaft for maintaining driving relationship between the blower and said shaft regardless of the position of the moldboard.

13. The combination with a moldboard for removing snow and other material, of a jet propulsion burner mounted at the rear of the moldboard and having its exhaust positioned to direct a hot blast into the material discharging from the moldboard, thereby to accelerate the movement of the material and the dissipation thereof.

14. The combination with a moldboard for removing snow and other material, of a jet propulsion burner mounted on the rear of the moldboard and having a discharge nozzle positioned to direct a hot blast into the material discharging from the moldboard thereby to accelerate its movement.

15. The combination with a moldboard for removing snow and other material, of jet propulsion means positioned to direct a high velocity blast against the material being moved along the face of the moldboard, thereby to accelerate its movement in the general direction of discharge.

16. The combination with a moldboard adapted to be propelled by a power driven vehicle, of jet propulsion means mounted on the rear of the moldboard and having a restricted high velocity nozzle positioned to direct a hot blast into the material discharging from the moldboard, thereby to accelerate its movement and the dissipation thereof.

17. The combination with a vehicle having a moldboard mounted thereon, of a combustion chamber mounted rearwardly of the moldboard, means on the vehicle for supplying a fuel mixture to the combustion chamber under pressure, fuel ignition means, and said combustion chamber having an exhaust nozzle positioned to direct a hot blast against the material discharging from the moldboard, thereby to accelerate the movement of the material and the dissipation thereof.

18. The combination with a vehicle having a moldboard mounted thereon, of a combustion chamber mounted rearwardly of the moldboard, means on the vehicle for supplying a fuel mixture to the combustion chamber under pressure, fuel ignition means, and said combustion chamber having a narrow elongated exhaust nozzle disposed transversely of the moldboard adapted to direct the hot products of combustion from the combustion chamber against the material moving along the moldboard, thereby to accelerate the movement of the material and the dissipation thereof.

19. The combination with a vehicle having a moldboard mounted thereon, of a combustion chamber having a narrow elongated exhaust nozzle positioned to direct the products of combustion into the material moving along the face of the moldboard, thereby to accelerate its movement away from the vehicle.

20. The combination with a vehicle having a moldboard mounted thereon, of a combustion chamber having a narrow elongated exhaust nozzle positioned to direct the hot products of combustion into the material being moved by the moldboard, thereby to accelerate its movement and the dissipation thereof, and upwardly inclined vanes in said nozzle for directing the discharging material in an upward direction.

21. The combination with a vehicle having a snow plow mounted thereon, of a plurality of jet propulsion burners mounted rearwardly of the snow plow, means on the vehicle for supplying compressed air and fuel to said burners, fuel ignition means, and said burners having a discharge nozzle positioned adjacent to the rear end of the snow plow adapted to direct a blast of hot air against the snow and other material being moved along the face of the snow plow, thereby to accelerate its movement and the dissipation thereof.

22. The combination with a vehicle having a snow plow mounted thereon and comprising a moldboard, of a plurality of jet propulsion burners mounted rearwardly of the snow plow, means on the vehicle for supplying compressed air and fuel to said burners, fuel ignition means, and said burners having a common discharge nozzle positioned adjacent to the rear end of the moldboard transversely thereof adapted to direct a blast of hot air against the snow discharging from the moldboard thereby to accelerate its movement and the dissipation thereof, and deflecting means in said nozzle for slightly upwardly directing the discharged snow.

23. The combination with a vehicle having a moldboard mounted thereon, a combustion chamber at the rear of the moldboard, means on the vehicle for supplying high pressure air to the combustion chamber, fuel supply means, ignition means, and said combustion chamber having a discharge nozzle positioned at the discharge end of the moldboard adapted to direct the hot products of combustion against snow or other material being moved along by the moldboard at high velocity, thereby to accelerate the movement of the material and also whereby the reactive force of the high velocity blast against the material will have a forwardly propelling effect upon the vehicle.

24. The combination with a vehicle having a moldboard mounted thereon for moving snow, ice and other material, a jet propulsion burner supported rearwardly of the moldboard, means for supplying air and fuel to said burner under pressure, fuel ignition means, and said burner having an exhaust nozzle secured to the back of the moldboard with its discharge end positioned to direct the products of combustion at high velocity against snow and ice discharging from the moldboard in a direction to exert a propelling effect on the outer end of the moldboard and simultaneously to accelerate and dissipate the snow and ice discharging from the moldboard.

25. The combination with a moldboard, of a jet propulsion burner having its discharge positioned adjacent to the outer end of the moldboard adapted to direct a hot blast in the direction of discharge from the moldboard, thereby to melt snow and ice beyond the end of the moldboard.

26. In combination with a vehicle having a snow-engaging member, a jet propulsion burner positioned adjacent to the snow engaging member and having its exhaust or discharge nozzle positioned to direct a hot blast in an outwardly and rearwardly direction with respect to the snow-engaging member, whereby said hot blast may be utilized to melt snow and ice, and also whereby the thrust reaction of said blast will exert a forwardly propelling effect on the vehicle.

27. In combination with a vehicle having a snow-engaging member, a jet propulsion burner supported on the snow engaging member and having a high velocity discharge nozzle positioned to direct a hot blast in an outwardly and rearwardly direction with respect to the snow-engaging member, whereby said hot blast may be utilized to melt snow and ice along a road-bed and in the gutters adjacent thereto.

28. In combination with a vehicle having a snow plow mounted thereon, jet propulsion burner means mounted rearwardly of the snow plow, means on the vehicle for supplying compressed air and fuel to the burner means, fuel ignition means, and said burner means having a discharge nozzle positioned adjacent the rear end of the snow plow adapted to direct a blast of hot air against the snow and other material being moved by the snow plow thereby to accelerate its movement and the dissipation thereof.

29. The combination with a snow-removing apparatus including a snow-engaging member, of a combustion-type jet propulsion burner attached to said member and positioned thereon for ejecting and disbursing snow discharging from the member.

EDWARD R. GREER.